Patented May 27, 1930

1,760,091

UNITED STATES PATENT OFFICE

HARDEN F. TAYLOR, OF BRONX, NEW YORK, ASSIGNOR TO THE ATLANTIC COAST FISHERIES COMPANY, OF NEW YORK, N. Y., A CORPORATION OF MAINE

TREATMENT OF COMESTIBLES WITH SMOKE

No Drawing.     Application filed April 9, 1928. Serial No. 268,812.

The present invention relates to comestibles and more particularly to the art of smoking fish, meats and similar products.

In the smoking of fish and meats, the smoke is usually produced by the decomposition of wood or woody substances by means of heat, the smoke so produced being allowed to be conveyed by air currents to and among the pieces of food. In this process the smoke substance is deposited on and adsorbed by the pieces of food, the latter acquiring thereby a pleasing flavor and color, and usually some degree of preservation.

It is well known that the products of decomposition of wood include many individual chemical substances, some being gaseous, some liquid and some solid, at the temperature prevailing in a smokehouse, and that the entire mixture of these substances constitute the desirable treatment. For instance, smoke contains acids, aldehydes, ketones, esters, phenols, alcohols, etc. Among these compounds are several that are distinctly objectionable from one or more points of view. For example, formaldehyde, a substance that is distinctly poisonous and usually not permitted to be used in foods by health authorities, exists in wood smoke, and is probably responsible to a considerable degree for the preservative effect of smoke. It toughens the tissues of fish and meat and combines by well-known chemical reactions with the amino acids, proteins, amines, etc., some of which give the flavor to the foods. When these are destroyed by formaldehyde in the reactions referred to, the desirable flavors disappear from the foods. Formaldehyde certainly does not improve digestibility of foods, and in all probability impairs it. By the process I have invented, formaldehyde is eliminated as such from the smoke before it comes into contact with the fish, and other aldehydes likewise undergo chemical changes which deprive them of undesirable properties.

Another class of undesirable substances in smoke is acids, such as acetic, formic and valeric, which bring about a surface coagulation of proteins. They also have the incidentally undesirable effect of attacking metal parts that may be used in the construction of smokehouses and their accessories.

A further class of substances in smoke causes the color of the smoked foods. The chemistry of this class is not so well known as those already cited, but I have found them, at least in part, to be similar in their behavior to pyrogallol which is readily oxidized to a brown color under alkaline conditions, but not under acid conditions. The acids in smoke give rise to conditions in the smokehouse which are unfavorable to oxidation of these substances, making a good color more difficult to obtain. By my invention I can easily control the development of a pleasing color with greater speed and economy.

It is, therefore, an object of this invention to provide a method of smoking comestibles wherein the undesirable ingredients or constituents of the smoke are eliminated.

Another object of this invention is to provide a method of smoking comestibles wherein the smoke is free from acids and has an alkaline reaction.

A further object of this invention is to provide a method of smoking comestibles wherein the color of the comestibles may be controlled.

A specific object of this invention is to provide a method of smoking fish wherein ammonia gas is added to the smoke in such quantities as to render the smoke alkaline in reaction.

Further objects will become apparent from the following description and the hereinafter appended claims.

One embodiment of carrying out my invention consists in the addition of a volatile or gaseous alkali such as ammonia gas in regulated quantity to the smoke before it comes in contact with the foods. Such an alkali has the necessary combination of properties, in that it is (a) volatile, and therefore easily miscible with smoke; (b) alkaline, neutralizing the acids above referred to forming harmless ammonium salts; (c) combines with formaldehyde forming a practically tasteless, harmless substance; (d) with other aldehydes it forms addition-compounds or other compounds which are relatively harmless.

Furthermore, when used in quantity slightly in excess of that required to neutralize all acids and to combine with all aldehydes in the smoke, it brings about an alkaline condition which favors the development of color, presumably by promoting oxidation of pyrogallol-like substances.

In practicing this method the volatile alkali may be added in any desired manner by well-known means. Preferably, I generate smoke from wood in a generator built separately from the smokehouse proper and convey the smoke through ducts to the latter by fans or other convenient means. The ammonia gas in predetermined and regulated quantities may be added to the smoke in the smoke-conveying duct or in the outlet nozzle.

It is desirable to generate the smoke so that there will be a substantially constant supply and composition of smoke in order that the addition of ammonia may be adjusted to the requirements of the amount and composition of the smoke produced. When the smoke is being produced I add the ammonia in such quantities as necessary to produce a slight excess, as shown by a piece of moist litmus or phenolphthalein paper in the smokehouse. By giving less or more ammonia to the system, I can impart to the comestibles treated a color varying from yellow to reddish brown, as desired.

In addition to controlling the color of the final product, the process results in a product which is substantially free of coagulated proteins. In many instances, particularly in the case of fish, the smoked product is characterized by an acidity which is lower than that possessed by the fish prior to smoking.

I do not intend to limit myself to the exact and precise details set forth above, since modifications may be made without departing from the nature and scope of the invention.

I claim:

1. A method comprising treating comestibles with smoke having an alkaline reaction.

2. A method comprising treating comestibles with smoke having an excess of ammonia gas.

3. A method comprising treating comestibles with smoke having an excess of ammonia gas, the amount of said excess depending on the desired color of the treated comestibles.

4. In the method of treating comestibles with smoke, the step of adding a volatile alkali to the smoke.

5. In the method of treating comestibles with smoke, the step of adding a volatile alkali to the smoke in sufficient quantities to neutralize the acids and substantially destroy the aldehydes.

6. In the method of treating comestibles with smoke, the step of adding ammonia gas in sufficient amounts to render the smoke alkaline in reaction.

7. A method comprising treating fish with smoke having an alkaline reaction.

8. A method comprising treating fish with smoke having an excess of ammonia gas.

9. A method comprising treating fish with smoke having an excess of ammonia gas, the amount of said excess depending on the desired color of the treated fish.

10. In the method of treating fish with smoke, the step of adding a volatile alkali to the smoke in sufficient quantities to neutralize the acids and substantially destroy the aldehydes.

11. In the method of treating fish with smoke, the step of adding ammonia gas in sufficient amounts to render the smoke alkaline in reaction.

12. Comestibles having substantially the properties produced by treating said comestibles with smoke free from acids and aldehydes including uncoagulated proteins and having an acidity lower than the untreated comestible.

13. Smoked fish having substantially the properties produced by treating fish with smoke containing an excess of ammonia gas including uncoagulated proteins and having an acidity lower than the untreated fish.

14. A method which comprises eliminating the acids from smoke and treating comestibles with the acid-free smoke.

15. A method which comprises eliminating the acids and destroying the aldehydes in smoke and treating comestibles with said acid and aldehyde free smoke.

16. A method which comprises eliminating the acids from smoke and treating fish with the acid-free smoke.

17. A method which comprises eliminating the acids and destroying the aldehydes in smoke and treating fish with said acid and aldehyde free smoke.

In testimony whereof, I have affixed my signature to this specification.

HARDEN F. TAYLOR.